United States Patent [19]

Peterson et al.

[11] Patent Number: 4,467,497
[45] Date of Patent: Aug. 28, 1984

[54] METHOD AND DEVICE FOR THE PRODUCTION OF THIN SLICES OF FROZEN MEAT SUITABLE FOR ROASTING OR GRILLING

[76] Inventors: Lars-Eric Peterson, Roslagsgatan 50-52 C, S-113 54 Stockholm; Jan Soderlind, Tallvagen 8 A, S-191 41 Sollentuna, both of Sweden

[21] Appl. No.: 429,467

[22] Filed: Sep. 30, 1982

Related U.S. Application Data

[63] Continuation of Ser. No. 151,735, May 20, 1980, abandoned.

[30] Foreign Application Priority Data

May 7, 1980 [SE] Sweden ............................... 8003443

[51] Int. Cl.³ ............................................... A22C 7/00
[52] U.S. Cl. ........................................ 17/45; 17/32; 100/153; 100/154; 100/176; 100/910
[58] Field of Search ............... 100/910, 151, 152, 153, 100/154, 176; 53/122; 17/32, 25, 1 R, 26, 45

[56] References Cited

U.S. PATENT DOCUMENTS

| | | | |
|---|---|---|---|
| 603,945 | 5/1898 | Edgerton | 100/152 X |
| 2,070,850 | 2/1937 | Trabold | 100/154 X |
| 2,175,275 | 10/1939 | Meyer | 100/152 X |
| 2,528,125 | 10/1950 | Elsaesser | 17/32 |
| 2,923,439 | 2/1960 | Benton | 100/151 X |
| 3,734,007 | 5/1973 | Husen | 100/152 |
| 3,756,231 | 9/1973 | Ross | 100/910 X |

FOREIGN PATENT DOCUMENTS 2140585 2/1973 Fed. Rep. of Germany.

Primary Examiner—Willie G. Abercrombie
Attorney, Agent, or Firm—Lewis H. Eslinger

[57] ABSTRACT

A method and a machine for the production from relatively thick flat pieces of frozen meat, for example roast beef, of thin slices suitable for roasting or grilling. The method is characterized by the fact that the flat meat pieces, before thawing above the freezing point taking place, are passed through a channel-shaped space of flat rectangular cross-section and of decreasing height in the direction of conveyance, which space is formed between two opposite endless conveying belts running in the same direction and in which the meat pieces are mangled and rolled to a desired final slice thickness substantially without loss of meat juice and blood. The machine in accordance with the invention is characterized by the fact that in a frame (1, 2) there are mounted an upper and a lower row of rolls (5, 11), each surrounded by an endless conveying belt (6, 12), of which rows of rolls one is slightly sloping in relation to the other and which between them form a flat channel-shaped space confined by the facing parts of the conveying belts, of rectangular cross-section, and of decreasing height in the direction of movement of the opposite belt parts, through which channel-shaped space the meat pieces are passed and thereby mangled or rolled to a final desired slice thickness substantially without loss of meat juice and blood.

4 Claims, 1 Drawing Figure

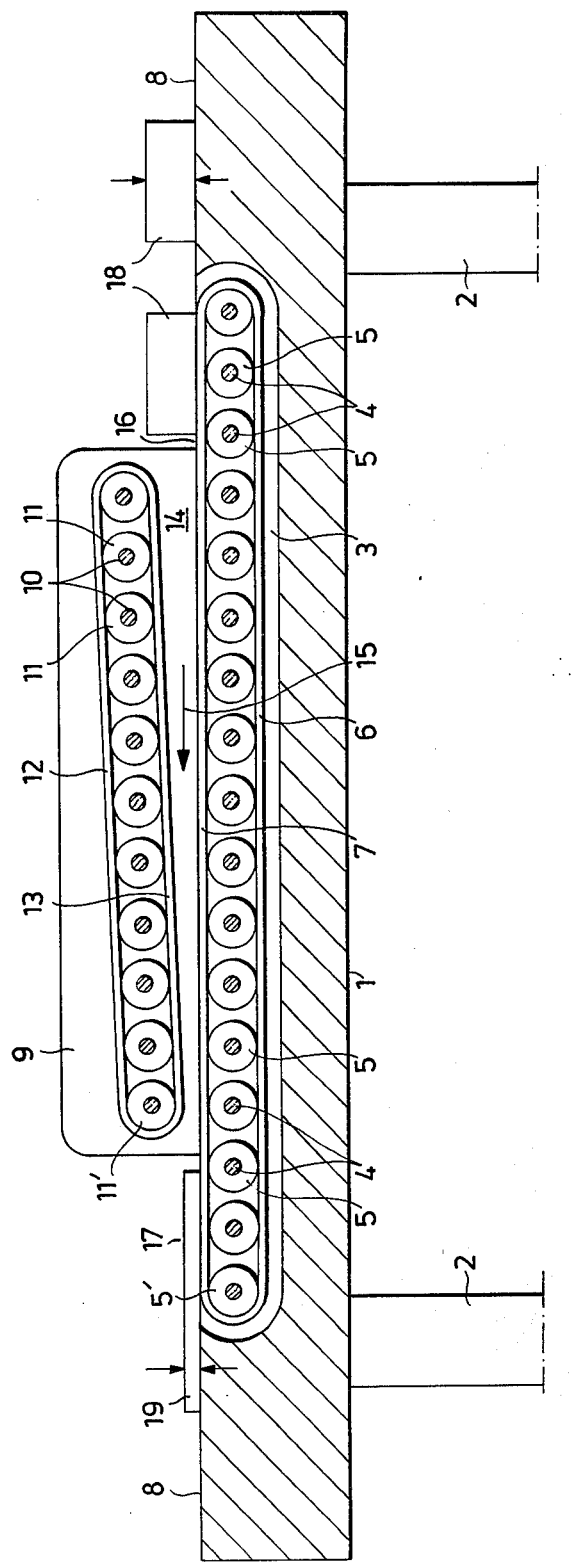

METHOD AND DEVICE FOR THE PRODUCTION OF THIN SLICES OF FROZEN MEAT SUITABLE FOR ROASTING OR GRILLING

This is a continuation of application Ser. No. 151,735, filed May 20, 1980, now abandoned.

The invention refers to a method for the production of thin slices of frozen meat suitable for roasting or grilling.

The production of thin meat slices, for example so called leaf steak, of frozen meat has up to now been done in such a manner that the piece of meat, for example the steak, taken out from the refrigerating chamber has been allowed to thaw and assume a temperature slightly above the freezing point, after which it has been cut into suitable, relatively thick slices which have then been pounded manually by means of a steak hammer or the like into very thin slices. Apart from the fact that this procedure is laborious and time consuming, it is impaired by the disadvantage that a considerable amount of meat juice and blood is pressed out of the meat at the pounding and is lost, whereby the product loses weight and quality.

The invention aims at a method and a device whereby the said disadvantages are avoided.

The method according to the invention for the production, from relatively thick flat pieces of frozen meat, for example roast beef, of thin slices suitable for roasting or grilling, is characterized by the fact that the flat meat pieces, before thawing above the freezing point taking place, are passed through a channel-shaped space of flat rectangular cross-section and of decreasing height in the direction of conveyance, which space is formed between two opposite endless conveying belts running in the same direction and in which the meat pieces are mangled and rolled to a desired final slice thickness substantially without loss of meat juice and blood.

The mangling or pressing of the meat preferably takes place at a temperature between −5° C. and −2° C.

The device or machine for carrying out the method is characterized by the fact that in a frame there are mounted an upper and a lower row of rolls, each surrounded by an endless conveying belt, of which rows of rolls one is slightly sloping in relation to the other and which between them form a flat channel-shaped space confined by the facing parts of the conveying belts, of rectangular cross-section, and of decreasing height in the direction of movement of the opposite belt parts, through which channel-shaped space the meat pieces are passed and thereby mangled or rolled to a final desired slice thickness substantially without loss of meat juice and blood.

For elucidation of the invention reference is made to an example represented in the accompanying drawing.

The single FIGURE diagrammatically shows a partially sectioned lateral view of a machine by means of which the method contemplated can be performed.

By 1 a table-top designated which rests on four legs 2. In the table-top 1 a number of rolls 5 are rotatably mounted in a straight line on shafts 4 within a trough-like depression 3. Around the straight row of rolls 5 there is applied an endless conveying belt 6 the upper part 7 of which is substantially on a level with the upper surface 8 of the table-top 1.

In a superposed structure 9 on the table-top 1 there is mounted a second straight row of rolls 11 on shafts 10. Also around this row of rolls there is applied an endless conveying belt 12. All of the roll shafts 4 and 10 are parallel to one another.

As shown, the upper row of rolls 11 is disposed slightly sloping in relation to the lower row 5, so that between the upper part 7 of the lower conveying belt and the lower part 13 of the upper conveying belt 12 there is formed a channel 14 of a flat rectangular cross-section, the height of which decreases in the direction of movement of the facing parts 7 and 13 of the belts 6 and 12, respectively, as indicated by the arrow 15, it being assumed that the rolls 5 of the lower row rotate counter-clockwise and the rolls 11 of the upper row rotate clockwise.

The lower conveying belt 6 is preferably longer than the upper belt 12 and arranged so as to extend beyond the upper belt 12 at both ends of the latter, to form input and output sections, as shown at 16 and 17.

The driving of the rolls 5 and 11 may take place in any suitable way. Generally, it is sufficient to drive a single roll of each row, preferably the roll 5′ and 11′ which terminates the row of rolls at the output end 17 of the machine. Possibly, several of the rolls of each row may also be driven or coupled together, but as a rule this is not necessary. Preferably, the driving takes place by means of an electromotor through a gear mechanism of some suitable kind. The conveying belts 6 and 12 move in the direction of the arrow 15 at a suitably chosen speed, for example 3 to 6 meters per minute. The length of the channel 14 may vary but usually amounts to about 0,7 to 1,5 meters.

The conveying belts 6 and 12 may be made of any material suitable for the purpose and easily capable of being sterilized, for example rubber or plastic which has been reinforced with textile or wire cloth. Rubber bands reinforced with nylon cloth are well suited for the purpose. The surface of the bands may be smooth or patterned in some desired way.

In each row of rolls, a roll terminating the row should be adjustable in a well-known manner to enable a control of the tension of the belt and a lengthening of the belt if this has been stretched during its use.

The production of thin meat slices intended for roasting or grilling from thicker ones takes place in the following way:

From frozen meat which has been allowed to assume a temperature from about −5° C. to about −2° C. slices 18 are cut which have a thickness of 3 to 4 cm. These slices are placed on the table 1 at the input end 16 of the machine and are in turn advanced into the channel 14 between the rows of rolls 5 and 11. At the passage through the channel 14 the meat pieces are mangled or rolled to form thin slices 19 having a thickness of, for example, 5 to 8 mm which leave the channel at the output end 17 of the machine. The whole of the mangling takes place below zero, as the machine is placed in a refrigerating chamber and has the same temperature as the meat. The mangling of the meat takes place quickly and conveniently and without any loss of meat juice or blood. The slices mangled are removed from the table 1 at the output end of the channel, and are packeted and distributed in frozen condition to the customer.

Various modifications of the illustrated machine are of course conceivable. Above it has been assumed that both rows of rolls 5 and 11 are coupled to the driving motor. According to a modification, only one row of rolls, preferably the lower one 5, is driven directly by the motor, while the upper row of rolls 11 runs freely.

In accordance with a preferred embodiment of the invention the length of channel 14 is about 4 meters and the number of rolls 5, 11 is about 80. The rolls are arranged in pairs and a nip is defined between the rolls of each pair. The gap between the rolls of the first pair at the input end of channel 14 is adjustable for adaption to the thickness of meat slice 18. This thickness is about 3–4 cm. At the output end of the channel the gap between the rolls of the last pair is about 2–3 mm. The rolls are generally completely stiff and are manufactured by thick walled tubes of acidproof weldless steel. The load on the rolls is at its maximum at the input and output ends of channel 14. The distance, seen in the direction of conveyance, between successive pairs of rolls is less than the size of the slice which means that the meat slice, during its passage through the channel, always will be in a nip of any of the pairs of rolls. The conveying speed is about 20–25 m/min. Since the width of the gap is decreasing from pair to pair in the direction of conveyance, since the distance between successive pairs of rolls is less than the size of the slice, and by suitably selecting the conveying speed the slice will be subjected to a stepwise treatment during its passage through the channel. Each step of this treatment is adapted to the structure of the meat so that the connective tissue thereof does not rupture. By providing the conveying belts 6, 12 with a honeycomb surface the slice will not move around between the conveying belts but will keep still. It will then expand well.

What we claim is:

1. A method of forming a thin, integral piece of frozen meat suitable for food preparation using a pair of mutually facing conveyor belts, each of which is passed over a plurality of rigid rollers spaced apart in the longitudinal direction of said belts, said spaced rollers being arranged in opposing pairs to provide a plurality of nips of gradually decreasing size longitudinally of said belts, the method comprising the steps of:

passing a relatively thick, flat, frozen integral piece of meat between said belts and through said nips while maintaining said piece of meat frozen to substantially reduce the overall thickness of the entire piece of meat;

reducing the thickness of the piece of meat a predetermined amount by each successive nip, wherein said predetermined amount is controlled substantially to prevent damage to the connective tissue in the piece of meat and loss of meat juice and blood therefrom, at a rate of between 0.7 mm/sec and 5.0 mm/sec; and introducing the piece of meat to each said nip before the piece of meat expands to the thickness thereof when it entered the next-preceding nip and before the piece of meat exits the next-preceding nip.

2. A method as in claim 1; wherein the piece of meat is maintained at a temperature of about −2° C. to about −5° C.

3. A method as in claim 1; wherein the piece of meat is reduced from a thickness of between 30 mm and 40 mm to a thickness of between 5 mm and 8 mm.

4. A method as in claim 1; wherein the piece of meat is reduced from a thickness of between 30 mm and 40 mm to a thickness of between 2 mm and 3 mm at a rate of between about 2.3 mm/sec and 4.0 mm/sec.

* * * * *